S. P. Smith,
Horse Rake.

No. 103,789.  Patented May 31, 1870.

Witnesses.
H. C. Ashkettle
Wm. A. Morgan

Inventor.
S. P. Smith
per Munn & Co.
Attorneys

United States Patent Office.

SOLOMON P. SMITH, OF WATERFORD, NEW YORK.

Letters Patent No. 103,789, dated May 31, 1870.

IMPROVEMENT IN HORSE HAY-RAKES.

The Schedule referred to in these Letters Patent and making part of the same.

*To all whom it may concern:*

Be it known that I, SOLOMON P. SMITH, of Waterford, in the county of Saratoga and State of New York, have invented a new and useful Improvement in Horse Hay-Rakes; and I do hereby declare the following to be a full, clear, and exact description thereof, reference being had to the accompanying drawing of the same, which makes part of this specification, in which—

Figure 1:
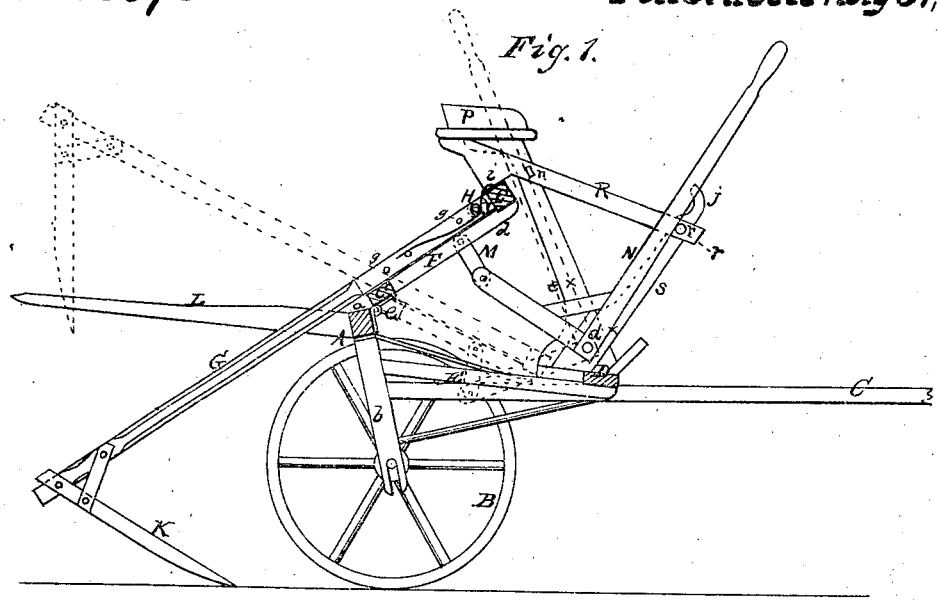
Figure 1 represents a vertical transverse section of a hay-rake embracing my improvement.
Figure 2:
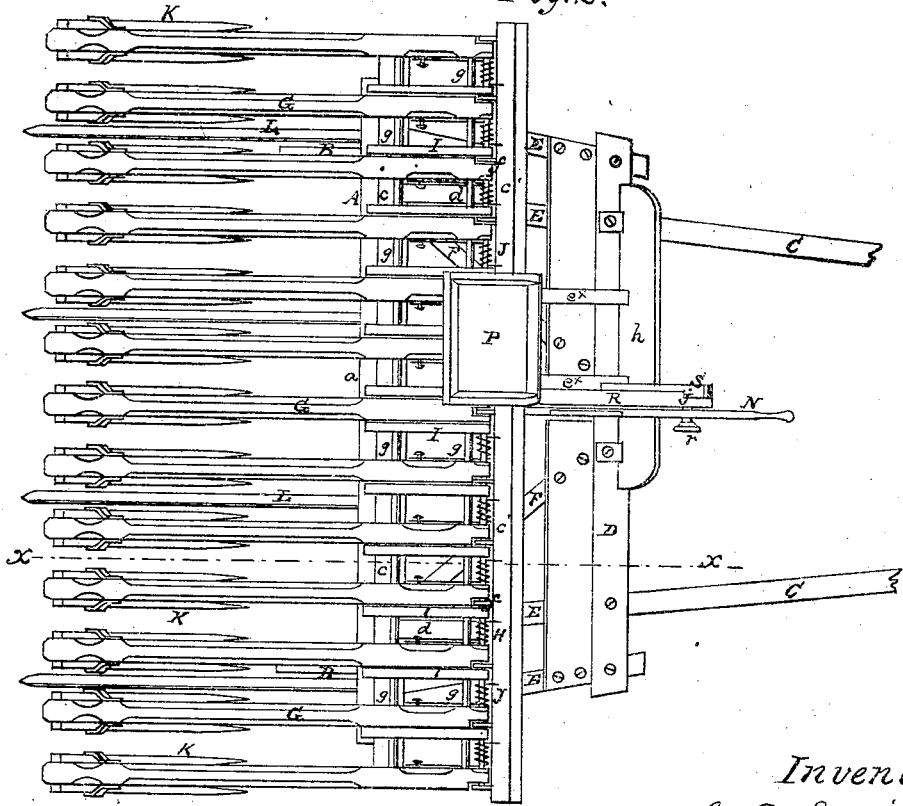
Figure 2 represents a plan or top view of the same.

In the accompanying drawing, the frame upon which the rake-teeth are supported consist of a horizontal transverse bar, $a$, from each end of which depends a pair of bars, $b\,b$, between and to which the supporting and carrying-wheel B are secured. The thills C are secured to and project from the inner pendent arms, and are connected by a cross-bar, D, (to which the foot-rest $h$ is secured,) in advance of the carrying-wheels; they are also braced to the pendent bars and to the cross-bar by inner and outer braces E, as shown in fig. 1 of the drawing.

The fixed supporting-bar $a$ being arranged above the carrying-wheels, the diameter of the latter must be such as to admit of their being placed beneath the drag-bars of the rake-teeth.

The drag-bars G are carried by a hinged tilting-frame, consisting of two parallel bars $c\,c'$, connected together by transverse bars $d\,d$, so as to form an oblong frame. The rear bar $c$ of this carrying-frame is connected, by strong hinges $e$, to the horizontal fixed supporting bar $a$ of the frame, and its front bar $c'$ projects a little in advance of the axis of the carrying-wheels.

The drag-bars are hinged to a horizontal rod, H, fitted in eye-bolts or bearings $f$ secured to the front bar $c'$, and extend rearward and rest upon the rear bar $c$ of the tilting frame; and, to their rear ends the wooden rake-teeth K are firmly secured and braced in pairs, so as to form an acute angle with their drag-bars. The latter are straight, made also of wood, and maintain an angle to the ground of about forty-five degrees when the rake is down, and, being hinged to the front bar $c$ of the tilting frame, the latter, to maintain such inclination of the drag-bars, extends upward and frontward, so as to form an obtuse angle with the pendent bars $b$, as shown in fig. 1 of the drawing.

The angle which the tilting frame maintains to the teeth, and to the supporting hangers $b$, is such that a line drawn from the front bar of said frame to the points of the teeth will pass between the axis of the wheels and the hinges $e$ of said frame, so that any undue pressure against the teeth, by the accumulation of the hay, will tend to lift them by pulling the front of the tilting frame down, so that, when a windrow is gathered, the frame is tilted and the teeth raised over it without much effort of the driver.

Another advantage of this arrangement of the tilting frame, drag-bars, and carrying-wheel is that, while the toothed ends of the drag-bars preponderate sufficiently to keep them to the ground while at work, it throws the balance of the rake to the front when not in use, and the thills are resting upon the ground, for the purpose of raising and keeping the teeth from contact therewith, thus preserving them from rotting; and this effect is obtained whether the teeth and their frame be up or down, because in either position of the parts the pendent bars $b$ will be vertical, and the preponderance of weight transferred to the front of the machine.

The weight of the drag-bars, in connection with their inclined position, tends constantly to keep them down to the surface of the ground when raking; but to insure this position, springs J are attached by one end to the front bar $c'$ of the tilting frame, and by the other to the drag-bars, so that their tendency is to constantly press the latter down.

The drag-bars are arranged at suitable distances apart, and, in order to maintain and brace them in such position, I secure thereto, by means of short cross-bars $g\,g$, parallel bars I, hinged also to the rod H, and of sufficient length to rest like the drag-bars upon the rear bar $c$ of the tilting frame. These short separating bars rest against the adjacent sides of the drag-bars, and constitute lateral supports to them, while their rear ends, resting upon the hinged bar $c$ of the tilting frame, prevent said drag-bars from twisting upon the rod H, and therefore avoids liability to split at their hinged ends, which would be the case were it not for the vertical and lateral support afforded by the rear ends of the separating and bracing-bars.

The seat P for the driver and operator is mounted upon two standards $e^x$, inclining rearward, and supported upon the cross-bar D of the thills in front of the tilting frame, so as to admit of the movement of the latter to elevate and depress the teeth, and bring the seat directly over the front bar of their carrying frame.

An arm, R, extends frontward from the under side of the seat P, and is connected at its front end to an arm, S, secured to the cross-bar D of the thills, so as to form an acute angle with the standards of the seat. The rear end of this arm R forms a stop, $i$, against which the front bar $c'$ rests, to limit the ascent of the tilting frame and the descent of the teeth, as shown in fig. 1.

The tilting frame is connected by a link, M, to the short end of an L-shaped lever, N, pivoted at its angle $d^x$ to the base of one of the standards of the seat. The handle of this lever extends upward, within reach of the operator, and, when the rake is at work, occupies a position next to a fixed foot-rest, $j$, at the front end of the arm R, so that the driver can place his foot against said rest and the lever, and thus hold the latter in position; and the angle which the link M maintains to the short end of the lever, when thus held, is such as to support the tilting frame when elevated against the stop $i$. To maintain the proper angle of the link with the lever, a stop-pin, $r$, is secured in the arm opposite the foot-rest $j$, which supports said lever, and prevents it from passing too far frontward, and a catch, $n$, having one of its sides inclined, is secured to this arm next to the seat, for the purpose of allowing the lever to pass over and be held by it when brought rearward to tilt the frame, thus locking the drag-bars and their teeth when elevated, as shown in dotted lines in the drawing.

This arrangement enables the driver, by his foot, to hold the teeth down when at work, and to lift them up by the same device, which serves both as a hand and foot-lever in controlling the tilting frame, thus dispensing with independent devices heretofore used, either to elevate or depress the rake-teeth.

The rake-teeth thus hinged and carried may rise independently of each other to pass over hills and obstructions, while they may be held closely to the ground, and gather up the cut grass without digging into and mixing the dirt with the hay, as is always the case with the wire-tooth rakes.

For the purpose of insuring the discharge of the hay from the teeth, horizontal bars or strippers L are secured to the rear side of the fixed bar $a$ of the frame, so as to project between the drag-bars and teeth when the latter are elevated.

Having described my invention,

I claim—

1. In connection with a tilting and carrying frame, inclining upward and frontward, the elevating-lever N, arranged in relation to the fixed foot-rest J, as described, so as to perform the functions of a hand and foot-lever to lift and hold up the teeth and to hold them down, as herein shown and described.

2. The arrangement of the single foot and hand L-shaped lever N, the fixed foot-rest $j$, the stops $i$ and $n$, the link M, the inclined hinged tilting and carrying frame, and seat P, as herein shown and described.

SOLOMON P. SMITH.

Witnesses:
A. H. WRAY,
J. J. HEFFERNAN.